SR

OR 3,450,461

June 17, 1969 KENJIRO TAKAYANAGI 3,450,461

COLOR PICTURE PROJECTING SYSTEM

Filed Nov. 4, 1964

INVENTOR

Kenjiro Takayanagi

BY Stevens, Davis, Miller & Mosher

ATTORNEYS

INVENTOR
Kenjiro Takayanagi
BY Stevens, Davis, Miller + Mosher
ATTORNEYS

United States Patent Office 3,450,461

Patented June 17, 1969

3,450,461
COLOR PICTURE PROJECTING SYSTEM

Kenjiro Takayanagi, Tokyo, Japan, assignor to Victor Company of Japan, Limited, Yokohama, Japan, a corporation of Japan Filed Nov. 4, 1964, Ser. No. 408,792
Claims priority, application Japan, Nov. 12, 1963, 38/60,758
Int. Cl. G02f *1/28;* H04n *5/38*
U.S. Cl. 350—161 4 Claims

ABSTRACT OF THE DISCLOSURE

A color picture projecting system wherein a deformable medium, such as an oil film, is scanned by an electron beam modulated by color pictures for forming recesses corresponding to the color pictures on said medium and primary color pictures corresponding to the recesses are enlarged and projected on a screen by applying Schlieren's optical system. The medium is scanned by one electron beam focus modulated in a longitudinal direction by one of three primary colors composing color pictures and simultaneously dot modulated or velocity modulated by the other two primary colors alternating in a predetermined period for forming the recesses on said medium in longitudinal and transverse directions corresponding to said primary colors. A color light corresponding to the primary colors for focusing modulation in the longitudinal direction and color lights of the other two primary colors alternating in synchronization with the predetermined period projected from two light sources on the medium, and slits provided at the front and back of the medium in order to take out only the required refracted light beam of light refracted at said recesses, respectively.

The present invention relates to a system for projecting a color picture, especially to a system for projecting color pictures according to Schlieren's optical system.

A main object of this invention is to provide a system which can project color pictures by very simple operation.

Another object of this invention is to provide the system for projecting the color picture by using an electron gun of simple construction.

Further object of this invention is to provide a system for projecting color pictures according to a refracting method using relatively large meshed slits and capable of obtaining more clear color pictures in comparison with the former system for projecting the color pictures according to the diffraction method, for example as the device described in U.S. Patent No. 3,078,338.

Another object of this invention is to provide a system of simple construction for projecting color pictures of excellent quality by using one electron beam.

Further objects and characteristics of this invention will be apparent from the following detailed explanation with reference to the drawings.

FIG. 1 shows the diagrammatic view of an optical system of one example of the device applied with the system of this invention;

FIGS. 2*a* and *b* are the enlarged plan views of a slit to be used for the device described above;

FIG. 3 shows the relation between the surface of the oil film and the electron gun;

FIGS. 4*a* and *b* are the views for explaining a method for scanning the electron beam;

FIGS. 8*a*, *b* and *c* are plan views showing each example of slits to be used in said second example.

Figures 1, 2:
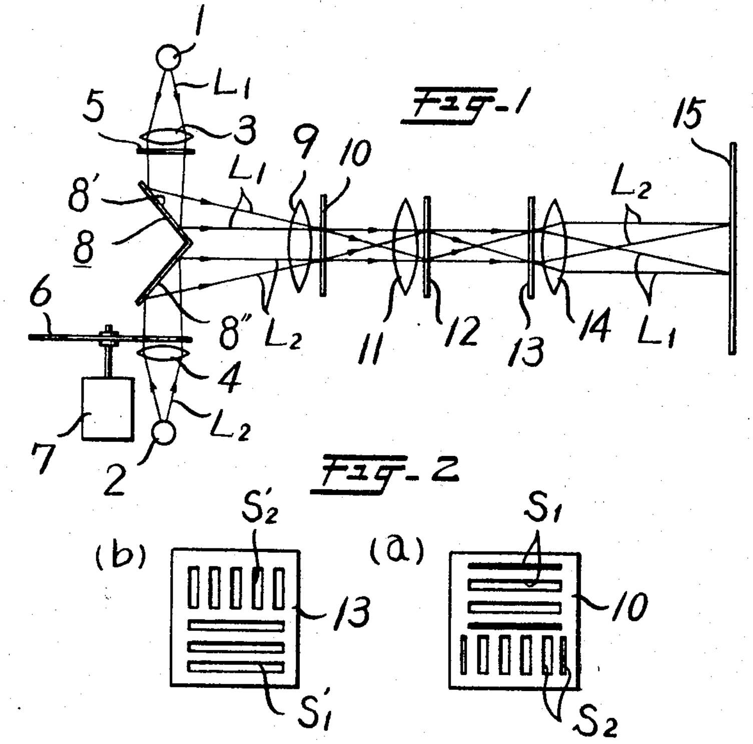
Figure 3:
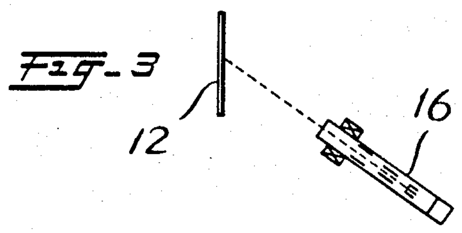

Referring to the drawings, in FIG. 1, 1 and 2 are light sources such as xenon lamps, etc., 3 and 4 are focussing lenses. 5 is a color filter and in this example it is green. 6 is a rotary circular filter having two color phases and is approximately same as the filter used in color television of the so-called CBS system and the color phases being red and blue in this example. 7 is a motor for rotating said rotary filter. 8 is a reflecting mirror having reflecting faces 8' and 8''. 9 is a focussing lens. 10 is a first slit. 11 is a focussing lens. 12 is an oil film. 13 is a second slit corresponding to said slit 10. 14 is a projecting lens. 15 is a screen. Further, in FIG. 1 there is not shown, but the electron gun 16 for scanning the electron beam on the oil film 12 is provided in the relative position as shown in FIG. 3. Next, the operation thereof will be explained.

Firstly, the light beam $L_1$ emanating from the light source passes through the focussing lens 3, filter 5 and is reflected by the reflecting face 8' and focussed by the focussing lens 9 and collected on the first slit 10. This first slit has the transverse slits $S_1$ on its upper half portion as shown in FIG. 2*a* and the longitudinal slits $S_2$ on the lower half portion thereof, said light beam $L_1$ is focussed on this transverse slits $S_1$. Further according to the former diffraction method, the widths of the slits must be so small as to generate the interference of light, but the widths of the slits in this invention may be large as compared to the wave length of the light.

Figure 4:
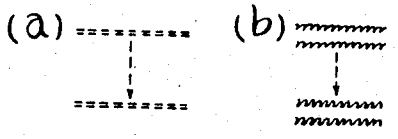

The image passing through the transverse slits $S_1$ by said focussing is projected on the second slit 13 after passing through the focussing lens 11 and oil film 12, but as shown in FIG. 2*b* said second slit is provided with the transverse slits $S_1'$ corresponding to the transverse slits $S_1$ being provided in said first slit 10 and it is constructed in such a way that the field of vision becomes dark when these two are superposed optically, so that the light beam $L_1$ passing through said first slit is shut-off here. Next, the light beam $L_2$ emanating from the light source 2 passes through the focussing lens 4, rotary filter 6 and is reflected by the reflecting face 8'' and passes through the focussing lens 9 and is focussed on the longitudinal slits $S_2$ of the first slit 10. Accordingly, the image passing through the longitudinal slits $S_2$ by this light beam $L_2$ passes through the focussing lens 11, oil film 12 and is projected on the longitudinal slits $S_2'$ of the second slit 13 which correspond to the longitudinal slits $S_2$ of the first slit 10, and as in the above case the light beam $L_2$ passing through the first slit 10 is shut-off here and no image appears on the screen 15. Now, when one electron beam is scanned on the oil film 12 from the electron gun 16, as shown in FIG. 3, and the modulation in the longitudinal direction is carried on in such a way that the longitudinal focussing of the electron beam is modulated by the green signal, while the modulation in the transverse direction is carried on in such a way that this electron beam is further dot-modulated as shown in FIG. 4*a*, or velocity-modulated as shown in FIG. 4*b* by the alternating red and blue signals. Consequently on said oil film 12 appear unevenness having the longitudinal and transverse components corresponding to the electron beam.

Owing to said unevenness, the light beams $L_1$ and $L_2$ passing through said oil film are refracted at these parts and the pass through the transverse slits $S_1'$, longitudinal slits $S_2'$ and then projecting lens 14, and reach to the screen 15. In this invention, this basic principle is utilized skillfully and enlarged projection of the color image by a single electron beam can be realized and further detailed explanation thereof is as follows.

Figure 5:
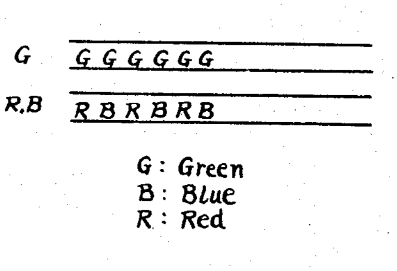
FIG. 5 is a view showing the alternate state of each field.
Figures 6, 7, 8:
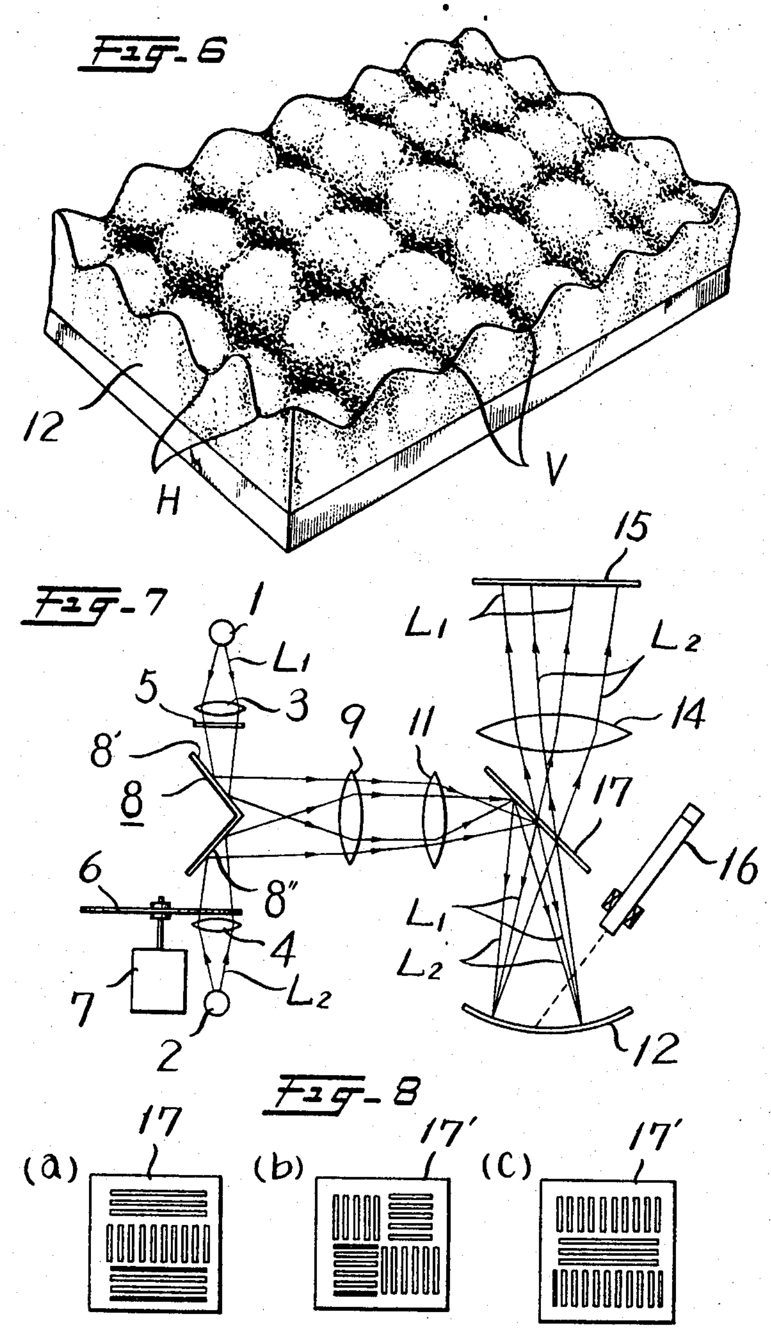
FIG. 6 is a perspective view partly enlarged showing an uneven state formed on the oil film.
FIG. 7 is a diagrammatic view of an optical system of another example of the device applied with the system of this invention.

Firstly, the rotary filter 6 having red and blue colors arranged alternately is rotated at the determined speed, as later described in detail, by the motor 7 and on the electron gun 16 are impressed the green signal as well as red and blue signals. In this way, each light source 1 and 2 is lighted, then the light beam $L_1$ and $L_2$ are refracted respectively as follows and projected on the screen 15. Namely, on the oil film 12, as shown in FIG. 6, the longitudinal recess V by longitudinal focussing being modulated by the green signal and transverse recess H by said dot modulation and velocity modulation being modulated by red and blue signals are formed at the same time, respectively, and the light beams $L_1$ and $L_2$ passing each recess are refracted in longitudinal and transverse directions, respectively, but the light beam $L_1$ on one hand passes through the transverse slits $S_1$ and $S_1'$, so that when the refraction in the longitudinal direction occurs in said light beam, said light beam goes to the screen 15, however even when the refraction in the transverse direction occurs, said light beam is interrupted by the second slit 13 and can not reach to the screen 15. Other light beam $L_2$ passes through the longitudinal slits $S_2$ and $S_2'$, so that when the refraction in the transverse direction occurs in said light beam, said light beam goes to the screen 15, but even when the refraction in the longitudinal direction occurs, said light beam is interrupted by the second slit 13 and can not reach the screen 15. Accordingly, if this longitudinal recess V is formed by the green signal and transverse recess H is formed by the red and blue signals alternating in determined period and the alternation of the color phase of said rotary filter 6 is synchronized with the alternating velocity of said red and blue colors, then the projected image of each color phase is projected in mixed and consistency, thus a complete color projected image can be obtained. The alternation of each color phase in this case is as shown in FIG. 5. Further, when in place of said rotary filter 6, a filter (fixed) of the color phase capable of consisting the colored picture by the two color method combining the color phase of the filter 5 is used the color projection picture can also be obtained by the two color method.

Further, various methods except the example described above can be considered for giving the modulations of the longitudinal and transverse recesses V, H by color signals.

As described above in detail, the present invention is characterized in that the longitudinal and transverse recesses, formed on the medium at the same time by one eletron beam of a determined color signal, are enlarged and projected by the optical system according to Schlieren's method including corresponding transverse and longitudinal slits, respectively, in the system in which oil film or a like medium is scanned on itself by one electron beam for forming recesses corresponding to the projecting image signal on said medium, with the image picture signal being enlarged and projected by the optical system according to Schlieren's method, thereby the desired object can be obtained.

Further, the example shown in the drawings is explained by taking transmission type as an example, but in order to embody the system according to this invention in practice, it is preferable to apply the refractory type (the one utilizing the refraction of the light striking the oil film) as shown in FIG. 7. In this case, as the slit described above, the slit 17 is combined with a bar mirror. Examples of slit 17 which may be used are shown in FIG. 8.

What I claim is:

1. A system in which Schlieren's optical system is applied for projecting color pictures on a screen, comprising two light sources; a filter of one of three primary colors; a rotary circular filter having two color phases of the other of said three primary colors and driven by a motor; two slit members provided with transverse slits and longitudinal slits; an electron gun; an oil film deformable by scanning an electron beam from said electron gun; means for focusing the light beam emanated from one of said two light sources and passing through said filter, on said transverse slits of the first slit member of said two slit members; means for focusing the light beam emanated from the other of said light sources and passing through said rotary filter, on said longitudinal slits of said first slit member; modulating means for modulating the longitudinal focusing of said electron beam with the color signal corersponding to the color of said filter; means for dot-modulating said electron beam with the color signals corresponding to said two color phases sequentially in synchronization with the rotation of said rotary circular filter; means for scanning said electron beam modulated by said modulating means, on said oil film; and means for projecting only light which is refracted by the deformed oil film and passed through the second slit member of said two slit members, on said screen.

2. A system for projecting color pictures according to claim 1 in which said means for dot-modulating is replaced with means for velocity-modulating said electron beam with the color signals corresponding to said two color phases sequentially in synchronization with the rotation of said rotary circular filter.

3. A system for projecting color pictures according to claim 1 in which said two slit members are replaced with one slit member and said means for projecting light is means for projecting on said screen only light which is refracted by the deformed oil film and reflected from the bottom of said oil film and passed through said one slit member.

4. A system for projecting color pictures according to claim 2 in which said two slit members are replaced with one slit member and said means for projecting light is means for projecting on said screen only light which is refracted by the deformed oil film and reflected from the bottom of said oil film and passed through said one slit member.

References Cited

UNITED STATES PATENTS

| | | | |
|---|---|---|---|
| 2,813,146 | 11/1957 | Glenn | 350—161 |
| 3,265,811 | 8/1966 | Ellis | 350—161 |

RONALD L. WIBERT, *Primary Examiner.*

W. L. SIKES, *Assistant Examiner.*

U.S. Cl. X.R.

178—5.4